(12) United States Patent
Shimada et al.

(10) Patent No.: US 7,846,377 B2
(45) Date of Patent: Dec. 7, 2010

(54) METHOD OF PROCESSING A SYNTHETIC RESIN TUBE, AND TUBULAR CONTAINER

(75) Inventors: Shinji Shimada, Tokyo (JP); Atsushi Ota, Tokyo (JP); Yasuyuki Imaizumi, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 780 days.

(21) Appl. No.: 10/548,904

(22) PCT Filed: Jun. 29, 2004

(86) PCT No.: PCT/JP2004/009129

§ 371 (c)(1),
(2), (4) Date: Nov. 3, 2005

(87) PCT Pub. No.: WO2005/000561

PCT Pub. Date: Jan. 6, 2005

(65) Prior Publication Data

US 2006/0188677 A1   Aug. 24, 2006

(30) Foreign Application Priority Data

Jun. 30, 2003   (JP) ............................. 2003-186515

(51) Int. Cl.
B29C 51/00 (2006.01)
(52) U.S. Cl. .................. 264/553; 264/563; 264/322
(58) Field of Classification Search ............... 428/35.7; 264/563, 322
See application file for complete search history.

(56) References Cited

U.S. PATENT DOCUMENTS 4,110,139 A * 8/1978 Mashida et al. ............ 156/79

5,296,188 A * 3/1994 Lupke ........................ 264/508

(Continued)

FOREIGN PATENT DOCUMENTS

JP    A 55-77535    6/1980

(Continued)

*Primary Examiner*—Christina Johnson
*Assistant Examiner*—Larry Thrower
(74) *Attorney, Agent, or Firm*—Oliff & Berridge, PLC

(57) ABSTRACT

The technical problem of this invention is to establish a method of processing a synthetic resin tube, in which the shape of a part of the tube wall is changed to form easily an attractively hollowed and/or raised portion in a fairly wide area of the tube wall. The object of this invention is to provide a tubular container having excellent decorativeness, appearance, or functionality that has never been found before. A method of processing a synthetic resin tube comprises utilizing a mandrel having a mold portion, which has at least a shape selected from a hollowed shape, a raised shape, and a hollowed and raised shape formed in a part of outer surface of the mandrel, and which is also provided with small through-holes in this mold portion; inserting a bottomed cylindrical mandrel into a synthetic resin tube, while bringing the inner wall of the tube in contact with the mandrel; heating and softening the tube in the portion facing the mold portion; deaerating the tube via a central opening and the through-holes to mold the softened portion of the tube in a manner similar to vacuum molding; and forming in the tube wall at least one of the portions selected from a hollowed portion, a raised portion, and a hollowed and raised portion.

11 Claims, 9 Drawing Sheets

U.S. PATENT DOCUMENTS

2002/0146527 A1 * 10/2002 Kikuchi et al. ............. 428/35.7

FOREIGN PATENT DOCUMENTS

| JP | A 57-12739 | 1/1982 |
|----|------------|--------|
| JP | A 59-199235 | 11/1984 |
| JP | U 61-8544 | 1/1986 |
| JP | A 8-72905 | 3/1996 |
| JP | A 2001-18287 | 1/2001 |
| JP | A 2002-11729 | 1/2002 |

* cited by examiner (a)

(b)

(c)

METHOD OF PROCESSING A SYNTHETIC RESIN TUBE, AND TUBULAR CONTAINER

BACKGROUND

This invention relates to a method of molding a hollowed portion, a raised portion, or a hollowed and raised portion in the body wall of a tubular container or a tube made of a synthetic resin, which is to be filled with a food, tooth paste, a cosmetic, and the like, and to a tubular container on which a hollowed and/or raised portion is formed.

Conventionally, tubular containers have been utilized to take out a given quantity of a viscous material, such as tooth paste. The bodies of these tubular containers comprise a tube obtained by extruding a synthetic resin in a cylindrical shape, or a tube of film with longer sides of the film joined together and adhered to each other. In many cases, laminated tubes are used, in which some resin layers are laminated.

A head consisting of neck and shoulder is adhered to one end of said tube, and the other end of the tube is thermally sealed. The finished product is used as a tubular container. Patent Document 1 has a description on a method of adhering the head to the tube.

As described above, the body of the tube is made and used by extruding a synthetic resin or resins in a cylindrical shape, or by joining and adhering longer sides of film together. In the case of ordinary tubular containers, the body is used in the flat, smooth state, without further processing. However, Patent Document 2 has descriptions on a surface-processed tubular container and on a method of producing such a tubular container. This method comprises utilizing an integrally joined tube prepared by rolling a synthetic resin sheet and thermally pressing together the overlap portions of the longer sides. When the lower end of the tube is heated and pressed for sealing, a pair of heating belts is used to emboss an up-and-down pattern from outside simultaneously with the sealing operation. It is asserted that this up-and-down pattern can be utilized for container recognition.

[Patent Document 1] Japanese Publication No. 1982-12739

[Patent Document 2] Japanese Application No. 1996-72905

SUMMARY

The method shown in Patent Document 2 involves embossing an up-and-down pattern on the tube surface within a limit of tube wall thickness. However, this method restricts the embossment only to a function for container recognition. But in recent years, there is an increasing need for a technology that can change the shape of a part of the container body wall to form an attractively hollowed, raised, and/or hollowed and raised portion (herein after referred to as a hollowed and/or raised portion), which is aimed at differentiating the tubes in both aspects of shape and function. In the shape aspect, the hollowed and/or raised portion of the tubular container can be printed or labeled for a decorative effect to catch the eyes of people to a product on a display rack. In the aspect of function, the hollowed and/or raised portion may be provided with an up-and-down pattern that serves for a recognizing function and also makes it easy to hold the tube with a hand.

The technical problem of this invention is a method of processing a tube, in which the shape of a part of cylindrical wall of the synthetic resin tube is changed to form easily an attractively hollowed and/or raised portion in a fairly wide area of the tube. The object of this invention is to provide a tubular container having excellent decorativeness, appearance, or functionality that has not been found before.

Among the means of this invention to solve the above-described technical problem, is a method of processing a synthetic resin tube, which comprises:

utilizing a bottomed cylindrical mandrel having a mold portion, which has at least a shape selected from a hollowed shape, a raised shape, and a hollowed and raised shape formed in a part of outer surface of the mandrel, and which is also provided with small through-holes in this mold portion;

inserting the mandrel into a synthetic resin tube, while bringing inner wall of the tube in contact with the mandrel;

heating and softening said tube in the portion facing said mold portion under the condition that the mandrel has been inserted in the tube;

deaerating the tube via a central opening and the through-holes of the mandrel to mold the softened portion of the tube in a manner similar to vacuum molding; and forming in the tube wall at least one portion selected from a hollowed portion, a raised portion, and a hollowed and raised portion.

The above-described method utilizes a bottomed cylindrical mandrel having a mold portion, which has at least a shape selected from a hollowed shape, a raised shape, and a hollowed and raised shape (hereinafter wholly referred to as the hollowed and/or raised mold portion) to be formed in a part of outer surface of the mandrel, and which is provided with small through-holes in this mold portion. The mandrel is inserted in the synthetic resin tube, and the inner surface of the tube is brought in contact with the mandrel. The tube is then heated and softened in the portion facing the mold portion under the condition that the mandrel has been inserted in the tube. This heating operation creates thermal shrinkage in the softened area. As a result, the periphery of the softened area of the tube wall comes in close contact with the curved outer surface of the mandrel in the area surrounding the mold portion. Because of this close contact, deaeration proceeds smoothly from the through-holes to the central opening of the mandrel. The softened portion is molded in a manner similar to vacuum-molding so as to trace the shape of the mold portion. Therefore, it is possible to change the shape of a part of the tube wall and to form a hollowed and/or raised portion, rather than embossing an up-and-down pattern on the outer surface of the tube.

The synthetic resin tube is usually molded by extruding the synthetic resin in a cylindrical shape or by joining the longer sides of a film together and adhering overlapped portions along these sides. When the tube is heated and softened, there occurs thermal shrinkage enough to give tightness in the above-described contact.

In the case of the molding carried out in a manner similar to vacuum molding, the softened resin deforms relatively uniformly because the resin is pulled from inside in all the softened area. There is no occurrence of partially biased drawing, and the softened portion can be molded so as to trace the shape of the mold portion, while minimizing wrinkle formation. Therefore, it is possible to mold an attractively hollowed and/or raised portion.

The tube is in the undercut engagement with the mandrel due to the shape of the hollowed and/or raised portion that has been formed according to the shape of the mold portion. This tube is squeezable and is made of a relatively soft synthetic resin to give a thin wall. After the hollowed and/or raised portion has been formed, the tube can be pulled and separated from the mandrel relatively easily, though the undercut portion is deformed to some extent at the time of pull.

The method of forming a hollowed and/or raised portion according to this invention is applicable to both of single-layer and multi-layer tubular containers. This method is also applicable to laminated tubes in which a thin film of a metal, such as aluminum, is sandwiched between polyethylene layers in a polyethylene-aluminum-polyethylene configuration.

The method according to one aspect of the invention comprises at least one of the shapes of the hollowed and/or raised portion is formed in the tube wall in the manner similar to vacuum-molding and that a press die made of a soft material is thrust onto the softened portion of the tube in the manner similar to press molding.

The softened portion of the tube is deformed to assume roughly the shape of the hollowed and/or raised mold portion in an operation similar to vacuum molding. Then, the press die is thrust onto the softened portion in the manner similar to press molding. The hollowed and/or raised portion is thus formed smoothly, with clear-cut edges being reproducible precisely.

If the press die were thrust onto the softened portion in the manner similar to press molding, without shaping first the hollowed and/or raised portion in the manner similar to vacuum molding, then the softened resin would deform disproportionately at the edges. In that case, wrinkles would develop, and it would not be able to form smoothly the hollowed and/or raised portion having attractive appearance. But if the softened portion is first allowed to take roughly the shape of the hollowed and/or raised mold portion in an operation similar to vacuum molding before the softened portion is processed in the manner similar to press molding, then the hollowed and/or raised portion can be formed smoothly, and highly reproducible, clear-cut edges would result.

The method according to another aspect of the invention comprises utilizing a press die made of silicon rubber.

As the soft materials, various rubber materials can be utilized in the above-described method. The press die of silicon rubber is suitable because of durability, fitness of the press die to trace the shape of the mold portion that has been hollowed and/or raised, and releasability from the softened area of the tube. Such a silicon rubber press die improves productivity and enables quite an attractively hollowed and/or raised portion to be formed.

The method according to another aspect of the invention comprises a press die having a flat press surface.

A soft material, such as silicon rubber, is used for the press die in the above-described method. Even if the press die has a flat press surface, it is possible for the softened area of the tube to trace the shape of the mold portion, provided that the irregularity is relatively shallow or low. The equipment cost concerning the press die can be reduced. The press die is not necessarily required to fit in precisely with the mold portion. Therefore, production efficiency can be maintained at a high level.

The method according to another aspect of the invention comprises using a press die having a press surface that roughly fits in with the shape of the mold portion.

The above-described method is effective to reproduce the shape of the mold portion in the tube wall even if the mold portion has a relatively deep up-and-down pattern. Thus, a hollowed and/or raised portion, which is identical with the shape of the mold portion, can be formed reproducibly in the tube wall.

The method according to another aspect of the invention comprises the mandrel having a hollowed mold portion in a part of the outer surface of the mandrel and that the hollowed mold portion in turn gives rise to a hollowed portion in the tube wall.

The above-described method utilizes a bottomed cylindrical mandrel, which has a hollowed mold portion to be formed in a part of surface of the mandrel, and which is also provided with small through-holes in this mold portion. The mandrel is inserted in the synthetic resin tube, and the inner wall of the tube is brought in contact with the mandrel. The tube is then heated and softened in the portion facing this mold portion under the condition that the mandrel has been inserted in the tube. This heating operation creates thermal shrinkage in the softened area. As a result, the periphery of the softened area of the tube comes in close contact with the curved outer surface of the mandrel in the area surrounding the mold portion. Because of this close contact, deaeration proceeds effectively from the through-holes to the central opening of the mandrel. The softened portion is molded in the manner similar to vacuum-molding so as to trace the shape of the mold portion. Thus, it becomes possible to form a hollowed portion in a fairly wide area of the tube.

The synthetic resin tube is usually molded by extruding a synthetic resin in a cylindrical shape or by joining the longer sides of a film together and adhering the overlap portion along these sides. When the tube is heated and softened, there occurs thermal shrinkage enough to give tightness in the above-described contact.

In the case of the molding carried out in the manner similar to vacuum molding, the softened resin deforms relatively uniformly in all the softened area. There is no occurrence of partially biased resin drawing, and an attractively hollowed portion can be molded smoothly.

The tube is in the undercut engagement with the mandrel due to the hollowed portion that has been formed. This tube is usually squeezable and is largely made of a relatively soft synthetic resin. After the hollowed portion has been formed, the tube can be pulled and separated from the mandrel relatively easily, though the undercut portion is deformed to some extent at the time of pull.

The hollowed portion is first formed in the tube wall in the manner similar to vacuum molding, and then the press die of a soft material (hereinafter referred to as the "core mold") having the shape corresponding to the hollowed mold portion and roughly the same size is thrust onto the softened portion of the tube in the manner similar to press molding. This operation ensures that the shape of the mold portion is reproducibly transcribed to the tube. The periphery of the hollowed portion thus obtained is in the shape of clear-cut edges, which are aesthetically attractive.

It should be noted here that, even if the molding were attempted from outside only by means of the core mold in the manner similar to press molding, no attractive hollowed portion would be formed smoothly. This is because the softened resin tends to deform disproportionately at the edges of the core mold. But if the softened portion is first allowed to take roughly the shape of the hollowed mold portion in an operation similar to vacuum molding before the softened portion is processed in the manner similar to press molding, then the hollowed portion can be formed smoothly, with resultant clear-cut edges being highly reproducible.

The method according to another aspect of the invention comprises the hollowed mold portion having such a shape that the depth of the mold gradually changes in a tapered manner in the axial direction of the mandrel.

Because based on the above method, the hollowed mold portion has such a shape that the depth of the mold gradually changes in a tapered manner in the axial direction of the mandrel, the tube can be pulled out of the mandrel smoothly after the hollowed portion has been formed and cooled.

The method according to another aspect of the invention comprises the mandrel having a raised mold portion in a part of the outer surface and that this mold portion serves to form a raised portion in the tube wall.

The above-described method utilizes a raised mold portion in a part of the outer surface of the mandrel. The processing in the manner similar to vacuum molding, or a combination thereof with the processing in the manner similar to press molding, can be used to change a part of the tube wall so as to form a raised portion in a fairly wide area of the tube.

The method according to another aspect of the invention comprises the mandrel having a hollowed and raised mold portion in a part of the outer surface and that this mold portion serves to form a hollowed and raised portion in the tube wall.

The above-described method utilizes the hollowed and raised mold portion in a part of the outer surface of the mandrel. The processing in the manner similar to vacuum molding, or a combination thereof with the processing in the manner similar to press molding, can be used to change a part of the tube wall so as to form a hollowed and raised portion in a fairly wide area of the tube. Such a hollowed and raised portion can be used to display characters, graphic figure, or a design.

The method according to another aspect of the invention comprises at least one of the hollowed and/or raised portions is formed so as to have a label function for the purpose of recognition.

According to theabove-described method, it is possible to display a trade name, a product name, etc., by means of the shapes of a hollowed and/or raised portion. Both the shape and number of the hollowed and/or raised portion or portions can be effectively utilized to make the product recognizable not only visually, but also by touch with a hand, as needed, for example, in the dark place. It is also possible to print a character or characters or attach a label on the hollowed portion so as to make the display much more impressive.

The method according to another aspect of the invention comprises a shape of the hollowed and/or raised portion is formed in the tube wall so that such a shape has a label function for a decorative purpose.

The above-described method is not used merely to emboss an up-and-down pattern on the tube wall. This method involves changing the shape of a part of the tube so as to form a hollowed and/or raised portion in a fairly wide area of the tube. A decorative effect not so far experienced can be expected. If this hollowed and/or raised portion is combined with printing, hot stamping, or label attachment, the tube will have an improved decorative effect.

The means of carrying out one aspect of the invention comprises a tubular container having a shape of the hollowed and/or raised portion, which is molded in the body wall of a tubular container in a manner similar to vacuum molding.

The means of carrying out another aspect of the invention comprises a tubular container having at least a shape selected from a hollowed portion, a raised portion, and a hollowed and raised portion, all of which are molded in the body wall in the manners similar to vacuum molding and press molding that follows the vacuum molding.

Under the above-described configurations, the shape of a part of tube wall is changed to provide a tubular container having a non-conventional hollowed and/or raised portion. The tubular container thus provided has decorativeness, appearance, or functionality that has never been achieved before.

EFFECTS OF THE INVENTION

This invention having the above-described configuration has the following effects:

The heating operation creates thermal shrinkage in the softened area. As a result, the periphery of the softened area of the tube comes in close contact with the outer surface of the mandrel in the area surrounding the mold portion. Because of this close contact, deaeration proceeds smoothly from the through-holes to the central opening of the mandrel. The softened area is molded in a manner similar to vacuum-molding so as to trace the shape of the mold portion. Therefore, it is possible to change the shape of a part of the tube wall and to form a hollowed and/or raised portion in a fairly wide area of the tube.

In the case of the molding carried out in a manner similar to vacuum molding, the softened resin deforms relatively uniformly because the resin is pulled from inside over the entire softened area. There is no occurrence of partially biased resin drawing, and the softened portion can be molded to trace the shape of the mold portion, while minimizing wrinkle formation. Therefore, it is possible to mold an attractively hollowed and/or raised portion smoothly.

A press die is thrust onto the softened area of the tube in a manner similar to press molding. This operation ensures that the shape of the hollowed and/or raised mold portion of the mandrel is reproducibly transcribed to the tube. For example, the shape of clear-cut edges, the meticulous up-and-down pattern of characters, etc., are quite reproducibly formed. The hollowed and/or raised portion thus obtained has an attractive, well functioning shape.

The press die of silicon rubberis used. Such a press die is suitable because of durability, fitness of the press die to trace the shape of the mold portion that has been hollowed and/or raised, and releasability from the softened area of the tube. The silicon rubber press die improves productivity and enables quite an attractively hollowed and/or raised portion to be formed.

A press die having a flat press surfaceis used. A soft material, such as silicon rubber, is used for the press surface. Even if the press die with a flat press surface is used, it is possible for the softened area of the tube to trace the shape of the mold portion, on the condition that the irregularity is relatively shallow or low. The equipment cost for the press die can be reduced. The press die is not necessarily required to fit in precisely with the mold portion. Therefore, production efficiency can be maintained at a high level.

Use is made of a press die having a press surface that roughly fits in with the shape of the mold portion. Such a press die is effective to reproduce the shape of the mold portion in the tube wall even if the mold portion has a relatively deep up-and-down pattern. Thus, a hollowed and/or raised portion, which is identical with the shape of the mold portion, can be formed reproducibly in the tube wall.

As a result of thermal shrinkage, the periphery of the softened area of the tube comes in close contact with the outer surface of the mandrel in the area surrounding the hollowed mold portion. Because of this close contact, deaeration proceeds effectively from the through-holes to the central opening of the mandrel. The softened portion is molded in the manner similar to vacuum molding so as to trace the shape of the hollowed mold portion. Therefore, it becomes possible to change a part of the tube wall so as to form a hollowed portion in a fairly wide area of the tube.

In the case of the molding carried out in the manner similar to vacuum molding, the softened resin deforms relatively uniformly in all the softened area. There is no occurrence of partially biased resin drawing, and an attractively hollowed portion can be molded smoothly.

The hollowed mold portion has such a shape that the depth of the mold gradually changes in a tapered manner in the axial direction of the mandrel. Under this configuration, the tube can be pulled out of the mandrel smoothly after the hollowed portion has been formed and cooled.

A raised mold portion is formed in a part of the outer surface of the mandrel, and is used to change a part of the tube wall so as to form a raised portion in a fairly wide area of the tube, by processing the tube in the manner similar to vacuum molding, or combining this processing with the processing in the manner similar to press molding.

A hollowed and raised mold portion is formed in a part of the outer surface of the mandrel, and is used to change a part of the tube wall so as to form a hollowed and raised portion in a fairly wide area of the tube, by processing the tube in the manner similar to vacuum molding, or combining this processing with the processing in the manner similar to press molding. This hollowed and raised portion can be used to express characters or figures.

It is possible to display a trade name, a product name, etc., by means of the pattern of a hollowed and/or raised portion. Both the shape and number of the hollowed and/or raised portion or portions can be effectively utilized to make the product recognizable not only visually, but also by touch with a hand, as needed, for example, in the dark place. It is also possible to print a character or characters or attach a label onto the hollowed portion so as to make the display much more impressive.

An up-and-down pattern is not merely embossed on the tube wall, but a part of the tube wall is changed in its shape so as to form a hollowed and/or raised portion. Therefore, a decorative effect not so far experienced can be expected.

The shape of a part of tube wall is changed to provide a tubular container having an attractively hollowed and/or raised portion or portions. The tubular container thus provided has decorativeness, appearance, or functionality that has never been achieved before.

BRIEF DESCRIPTION OF THE DRAWINGS

FIG. 9(*b*), a plan view showing the detail of the hollowed and raised mold portion shown in FIG. 9(*a*); and FIG. 9(*c*), a vertical section taken from line A-A in FIG. 9(*b*)

DETAILED DESCRIPTION OF EMBODIMENTS

Figure 3:
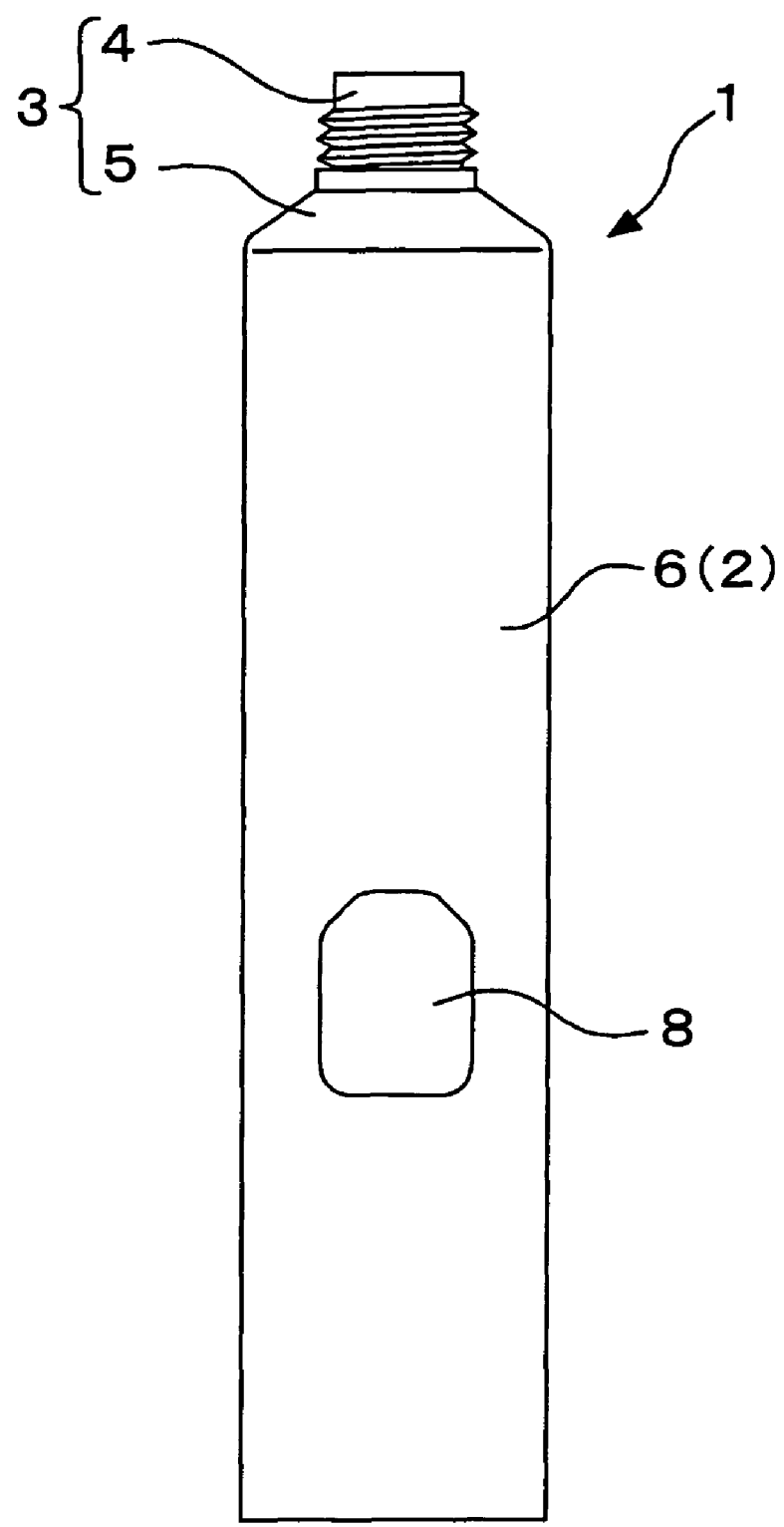
FIG. 3 is a front elevational view of an example of the tubular container of this invention obtained by the processing method shown in FIG. 1, wherein the bottom is not yet sealed.
Figure 4:
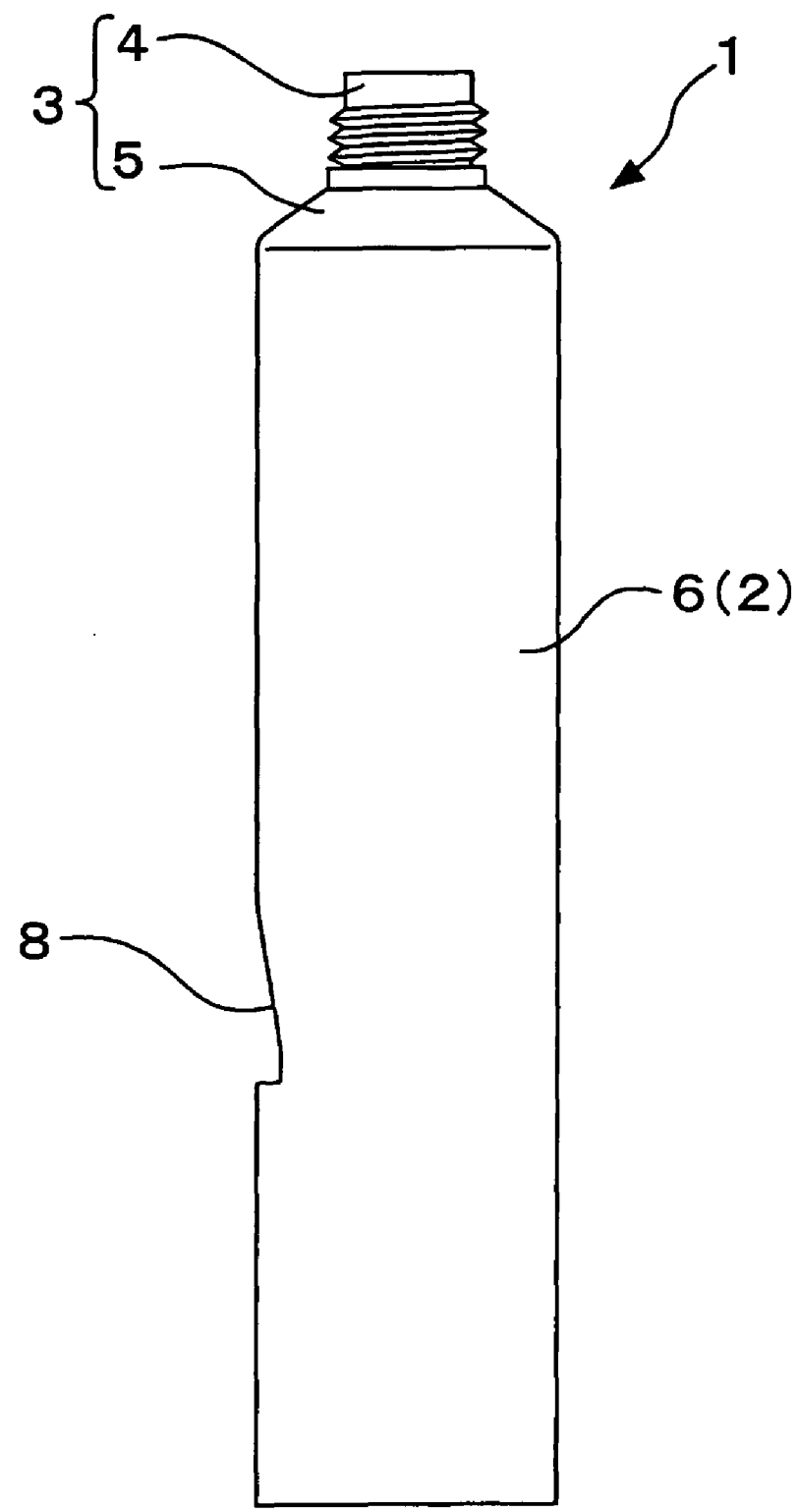
FIG. 4 is a side elevational view of the tubular container shown in FIG. 3.
Figure 5:
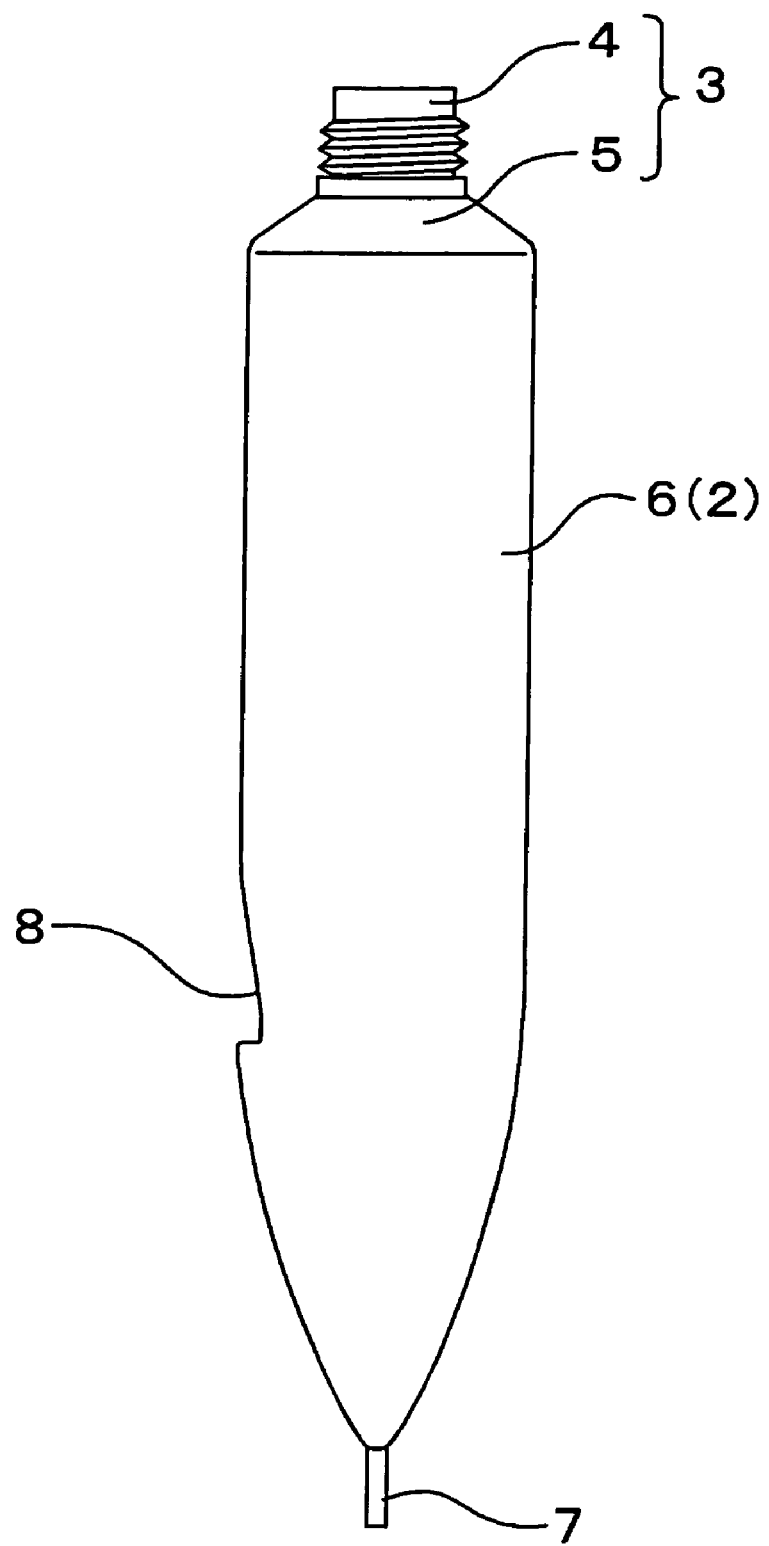
FIG. 5 is a side elevational view of the tubular container shown in FIG. 3, wherein the bottom has been sealed.

This invention is further described with respect to preferred embodiments, now referring to the drawings. FIGS. 3-5 show a tubular container obtained by the method of processing a synthetic resin tube in the first embodiment of this invention. FIGS. 3 and 4 are front and side elevational views, respectively, of a tubular container, which shows the bottom that is not yet sealed. FIG. 5 is a side elevational view of the tubular container having bottom seal 7. This tubular container is 25 mm in inner bore and 150 mm long.

As shown in FIG. 3, this tubular container 1 comprises a cylindrical tube 2, from which body 6 is made, and head 3, which includes shoulder 5 and neck 4. The head 3 is fitted to one end of the tube 2 integrally by means of injection molding or compression molding. The tube is filled with contents through the other end, and bottom seal 7 (See FIG. 5) is formed at this end.

The tube 2 is a laminated product obtained by multi-layer extrusion molding. Outer layer is made of a low-density polyethylene resin; and inner layer, a high-density polyethylene resin. Both the outer and inner layers have a wall thickness in the range of 200 to 250 microns.

The molding of the head 3 requires simultaneous adhesion to one end of the tube 2.

In one method, the tube 2 is fitted around the mandrel 11, wherein at the end of the mandrel the core mold for head 3 is formed.

Under this condition, the tube 2 and the mandrel together are inserted in the cavity where molten resin has been supplied. The resin is then compressed to mold the head 3 and to adhere the head 3 to the tube 2.

Or under above condition, the material used to form the head 3 is extruded in advance in the shape of a plate. The molten state plate is placed between the core mold and the cavity mold, and is punched out by the cutter that surrounds the tube 2. The punched plate is pushed into the cavity mold by the core mold, and the head 3 thus formed is then welded to the end of the tube 2.

Or under above condition, the head 3 is molded by injecting molding wherein molten resin is injected into the cavity formed between the core mold and the cavity mold.

Figure 1:
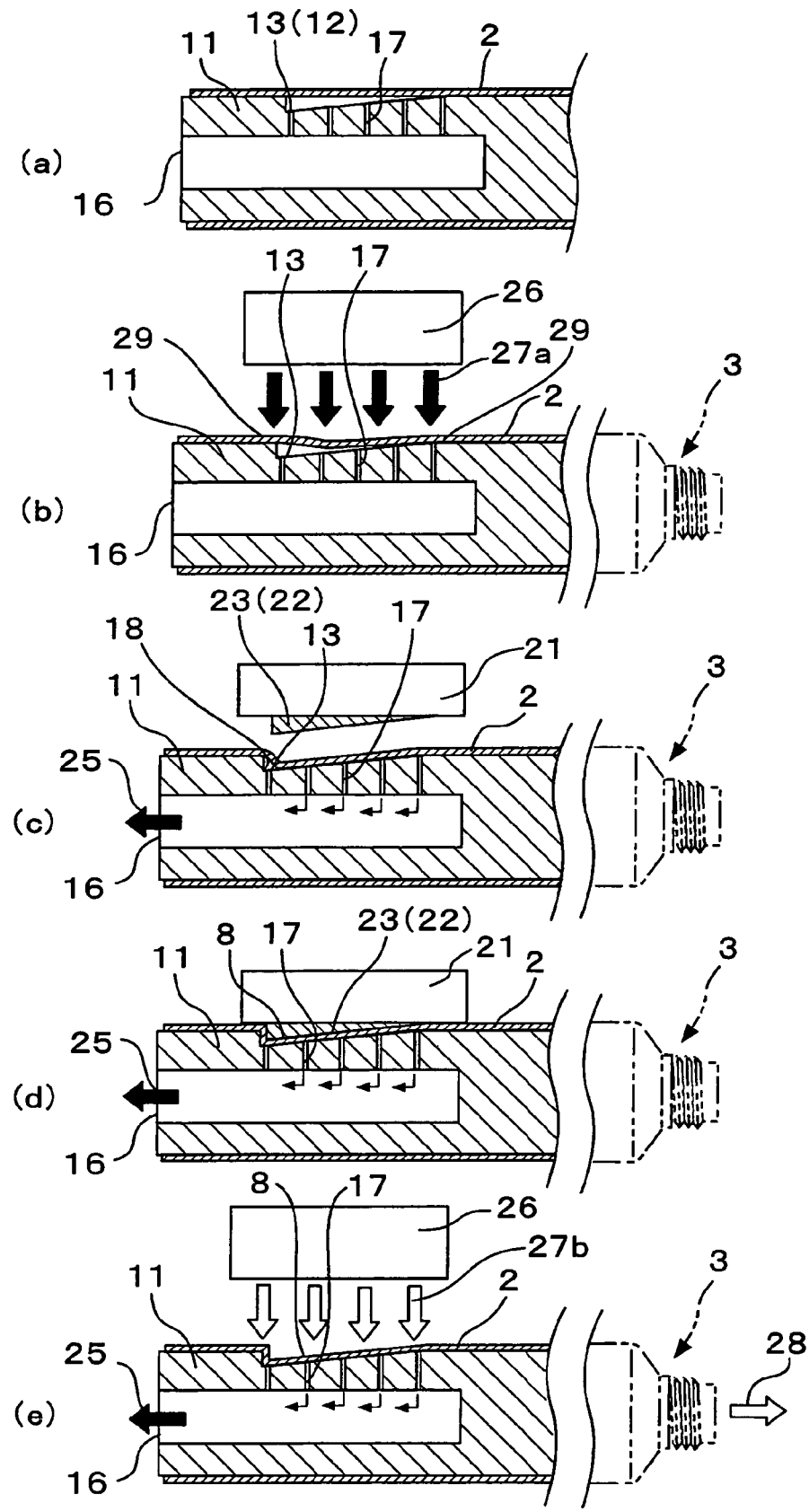
FIG. 1 is an explanatory diagram showing, in vertical sections, the processing method in the first embodiment of this invention.
Figure 2:
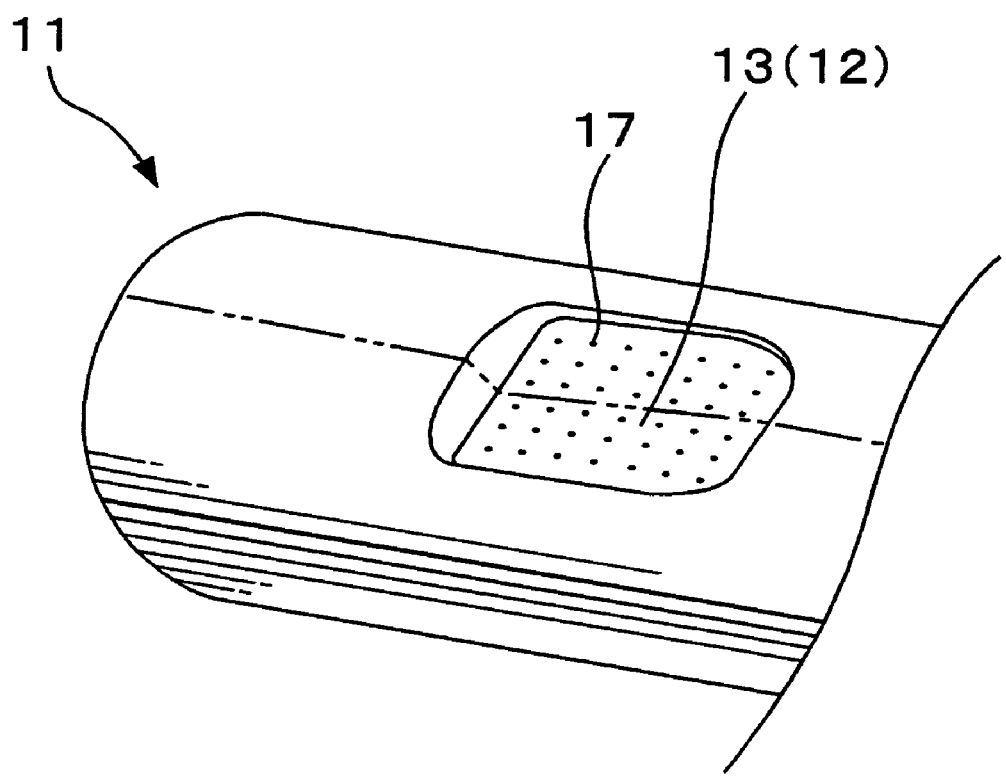
FIG. 2 is a perspective view of a part of the mandrel to be used in the processing method shown in FIG. 1.

FIG. 1 is an explanatory diagram showing the processing method in the first embodiment of this invention. FIG. 2 is a perspective view of the mandrel 11 used in this embodiment. The mandrel 11 has a bottomed cylindrical shape. A hollowed mold portion 13, i.e., one of the shapes of the hollowed and/or raised mold portion 12, is formed in a part of the outer surface of the mandrel 11 in such a way that the depth of the hollowed mold portion 13 is reduced in a tapered manner along the axial direction of the mandrel 11. The central opening 16 is connected to a vacuum pump to enable the tube to be processed in a manner similar to vacuum molding, by utilizing many small through-holes 17 drilled in the hollowed mold portion 13.

The method of molding a hollowed portion 8 in the wall of the tube 2 in this embodiment is described in accordance with the process flow shown in FIG. 1(*a*) through FIG. 1(*e*). FIG.

1(a) shows the mandrel 11 that has been inserted in the tube 2 in loose contact with the inner tube wall. Because of this loose contact, the mandrel 11 can be inserted easily. In addition, the tight contact of the mandrel 11 with the softened resin is secured on the periphery of the hollowed mold portion 13 at the time when resin is softened, as later described.

In many cases, as described above, the head 3 is adhered to the tube 2 under the condition that the mandrel 11 has been inserted in the tube 2. In this embodiment, however, the head 3 is adhered to one end of the tube 2 by the method described above, and then the mandrel 11 is inserted in the tube 2 through the other end of the tube 2.

Then, the resin is softened by heating the tube 2 from outside in the approximate area that faces the hollowed mold portion 13. This heating process creates thermal shrinkage in the softened area. As a result, the periphery of the softened area in the wall of the tube 2 comes in close contact with the curved outer surface of the mandrel 11 in the area surrounding the hollowed mold portion 13 (See the close-contact area 29 in FIG. 1(b)). Because of this close contact, deaeration proceeds smoothly from the small through-holes 17 to the central opening 16 of the mandrel 11. The softened portion is molded in a manner similar to vacuum-molding so as to trace the shape of the hollowed mold portion 13. Therefore, it is possible to form a hollowed portion 8 in a fairly wide area. Preferably, the softened area is somewhat wider than the hollowed mold portion 13 to make the contact sufficient (See FIG. 1(b)).

The tube 2 is heated in this embodiment by hot air 27a from a heater/cooler 26. The resin is softened under the blow of hot air 27a, and the close contact of the softened resin with the mandrel 11 can be achieved easily. The heating means is not restricted to this hot air 27a, but the heating with an infrared heater, etc., is also an effective means.

Air is evacuated from inside the mandrel 11 by means of a vacuum pump. The space between the softened resin wall and the hollowed mold portion 13 is thus deaerated through the small through-holes 17 (See black arrows showing the direction of deaeration in FIG. 1(c)). Now the softened resin takes the shape approximately tracing the shape of the hollowed mold portion 13 due to the operation similar to vacuum molding. At this stage, though, edges 18 may not be formed reproducibly well (FIG. 1(c)).

Under the configuration of this embodiment, many small through-holes 17 in the shape of small, round holes are disposed over the entire area of the hollowed mold portion 13. The shape, number, and layout of these small through-holes 17 can be determined by giving consideration to the shape of the entire mold portion 12 and the shape of edges 18. For example, clear-cut edges 18 can be formed more favorably in the wall of the tube 2 by disposing slit-like small through-holes 17 along the mold area that faces these edges 18.

A pressing block 21 is provided with a core mold 23 of silicon rubber, which serves as the press die 22, and of which press surface has the shape approximately fitting in with the shape of the hollowed mold portion 13. When this pressing block 21 is lowered, the softened resin is thrust onto the hollowed mold portion 13 in the manner similar to press molding, while continuing deaeration by means of the vacuum pump. At that time, the shape of the hollowed mold portion 13 including the edges 18 is transcribed to the tube 2 in a fully reproducible manner, and thus the hollowed portion 8 is formed in the tube wall (See FIG. 1(d)).

The shape and size of the core mold 23 are matching with those of the hollowed mold portion 13 in this embodiment. However, appropriate shape and size can be determined and used, as by utilizing a larger or smaller core mold 23 or by sharpening the edges, while giving consideration to the shape of the hollowed mold portion 13, including the details of edges, such as the arc of the edges, and reproducibility of the transcribed shape or moldability in the operation similar to press molding. Since the core mold 23 is made of a soft material, the core mold 23 of a somewhat larger size can be fitted in the hollowed mold portion 13, though there is a limit, of course.

The core mold 23 is then released. After cooling with cooling air from the heater/cooler 26, the tube 2 is pulled out of the mandrel 11 (See FIG. 1(e).). It is preferred that the tube 2 is cooled, with deaeration continued by means of the vacuum pump, to prevent the hollowed portion 8 from deforming during the cooling. Cooling air 27b is used to cool the tube 2 in this embodiment, giving consideration to the reproducibility of the shape of edges 18. But the tube 2 can be left to cool in ambient air, depending on the shape of the mold portion 12.

The hollowed portion 8 thus formed leaves the tube 2 to be in the undercut engagement with the mandrel 11. However, the hollowed mold portion 13 has such a shape that a gradual, shallow slope is formed in a tapered manner from the bottom of the hollow in the axial direction of the mandrel 11. Because of this shape, the tube 2 can be extracted smoothly from the mandrel 11 after the formation and cooling of the hollowed portion 8 (See the outline arrow 28 showing the direction of extraction in FIG. 1(e)).

Figure 6:
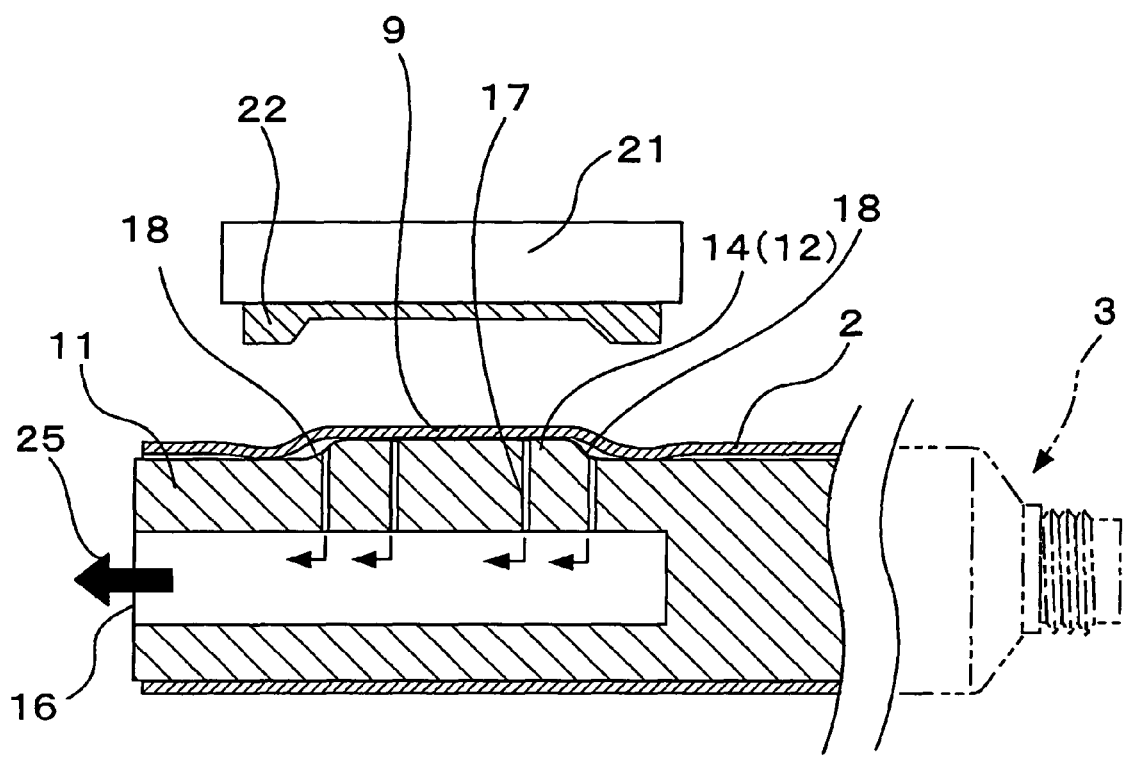
FIG. 6 is an explanatory diagram showing, in a vertical section, a process step in the second embodiment of the processing method according to this invention.
Figure 7:
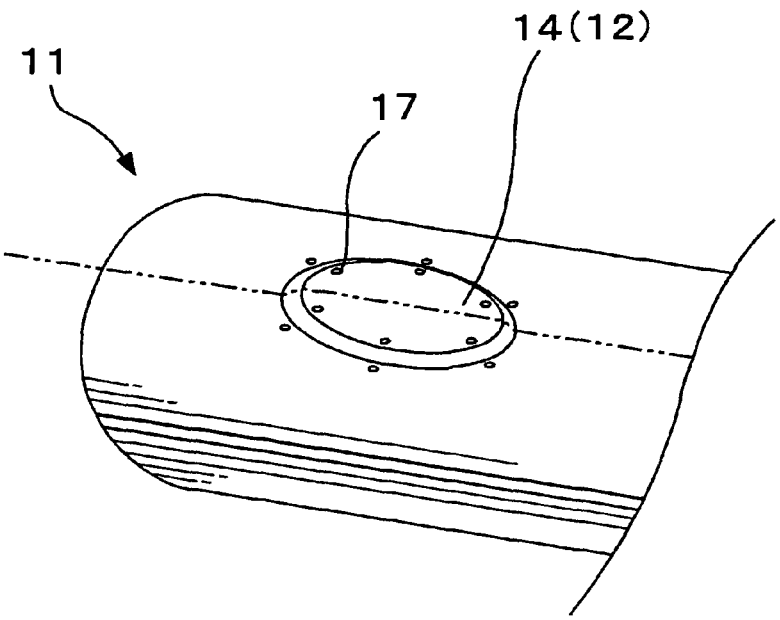
FIG. 7 is a perspective view of a part of the mandrel to be used in the processing method shown in FIG. 6.

FIGS. 6 and 7 illustrate the processing method in the second embodiment of this invention, showing a raised portion 9 in the wall of the tube 2. The steps of the processing method are similar to those of the first embodiment shown in FIG. 1. FIG. 6 shows a molding process similar to vacuum molding that corresponds to FIG. 1(c). FIG. 7 is a perspective view of the mandrel 11 used in the second embodiment. A raised mold portion 14 is an elliptical mold portion 12, and is formed in a part of outer surface of the mandrel 11. A number of small through-holes 17 are disposed inside as well as outside of the periphery.

The mandrel 11 having a raised mold portion 14 is inserted in the tube 2 to form a raised portion 9. Since the wall of the tube 2 is thin and flexible, the mandrel 11 can be easily inserted in the tube 2 by giving the shape of a steeple head to the inserting end of the mandrel 11.

Under the condition that the mandrel 11 has been inserted in the tube 2, there occurs some gap between the tube 2 and the outer surface of the mandrel 11. The resin of the tube 2 softens under hot air 27a (See FIG. 1(b)), and the heated resin contracts in and around the softened area. As a result, the tube wall comes in tight contact with the outer surface of the mandrel 11 on the periphery of the area of the raised mold portion 14. Because of this close contact, deaeration by means of the vacuum pump proceeds effectively. The softened portion is molded in a manner similar to vacuum molding so as to trace the shape of the raised mold portion 14. Therefore, a raised portion can be formed in a fairly wide area of the tube 2.

Especially, if there occurs a somewhat wider gap between the tube 2 and the outer surface of the mandrel 11, as found in this embodiment, then a cap is screwed onto the neck 4 to seal the neck and to facilitate deaeration by means of the vacuum pump effectively.

This second embodiment includes a process step of pressing softened resin onto the raised mold portion 14 in the manner similar to press molding, while continuing deaeration by means of the vacuum pump. This step is carried out to sharpen especially the shape of the edges 18, by utilizing a pressing block 21 provided with a silicon rubber press die 22, with its press surface having the shape roughly fitting in with the shape of the raised mold portion 14. In some cases, the raised portion 9 can be fully reproducible simply through the processing similar to vacuum molding, depending on the shape of the entire raised mold portion 14 or the shape of the edges 18.

Figure 10:
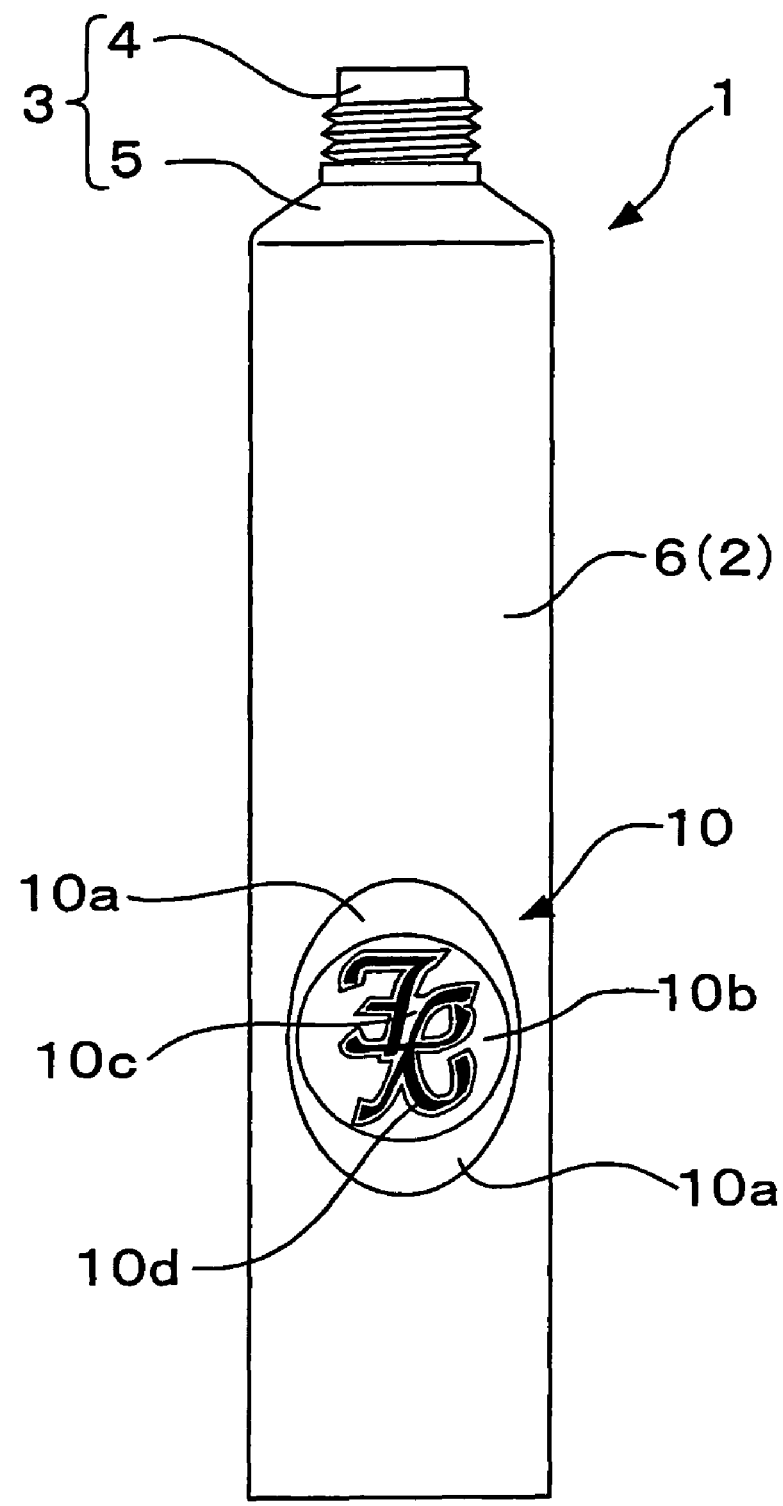
FIG. 10 is a front elevational view of another example of the tubular container of this invention, obtained by the processing method shown in FIG. 8, wherein the bottom is not yet sealed.

FIG. 10 is a front elevational view of another example of tube container of this invention, provided by the third embodiment of the processing method of this invention. The tube container of FIG. 10 shows the bottom which is not yet sealed. The tube container has the appearance similar to the container shown in FIG. 3, but has a hollowed and raised portion 10 formed in the front.

More particularly, the above-described hollowed and raised portion 10 comprises an elliptical hollowed portion 10a, a round raised portion 10b, and an embossed character pattern area 10c, which is formed inside the round raised portion 10b and contains an embossed alphabetical letter or letters displayed like an emblem. Inside this embossed character pattern area 10c there is a hot-stamped character or characters 10d, which look as though the character or characters have been embossed. Under this configuration, this tube has a display and decorative effect that has never been experienced before.

Figure 8:
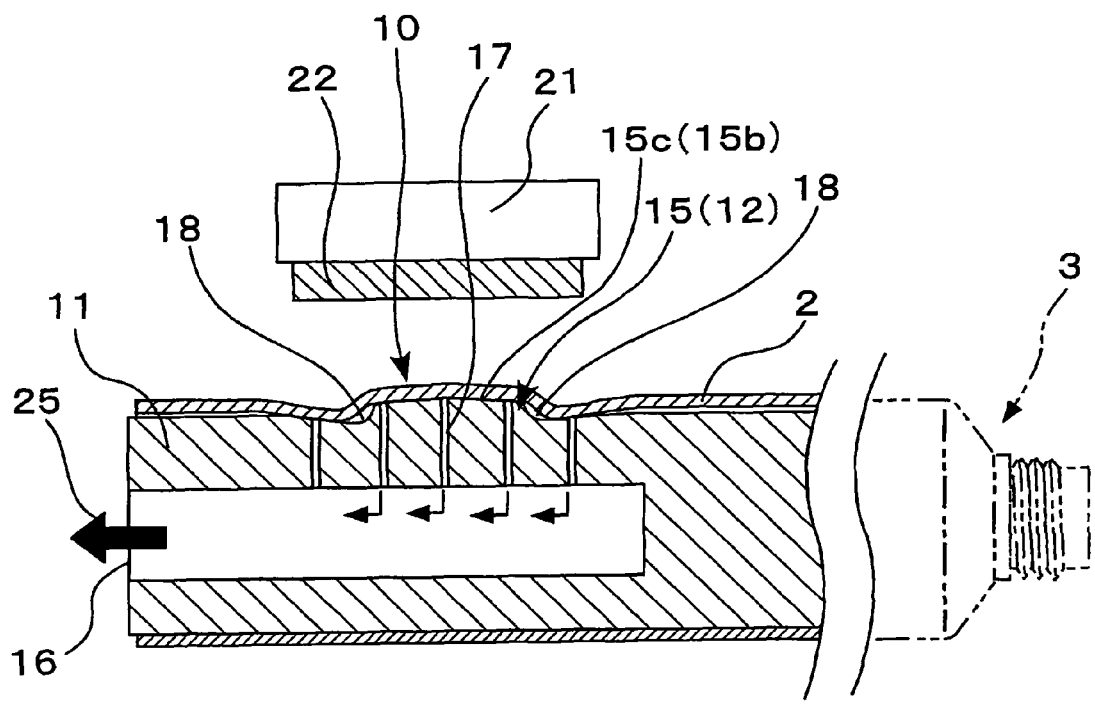
FIG. 8 is an explanatory diagram showing, in a vertical section, a process step in the third embodiment of the processing method according to this invention.
Figure 9:
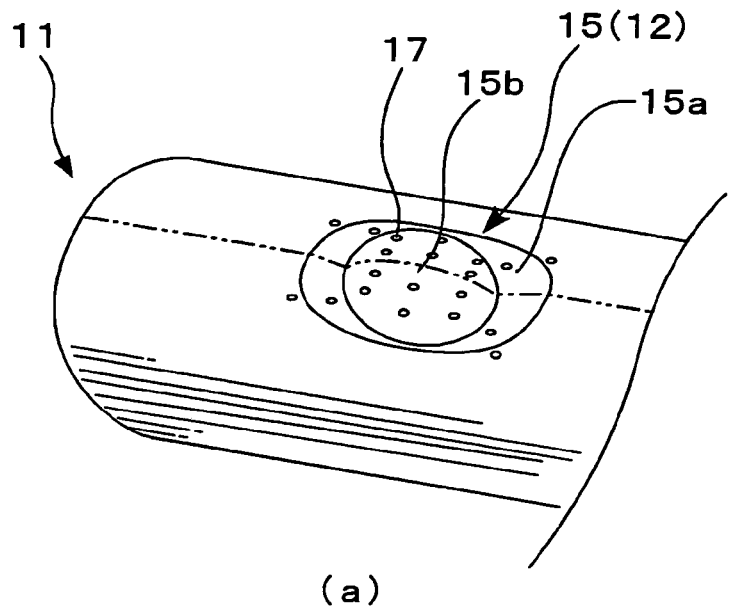
FIG. 9(*a*) is a perspective view of a part of the mandrel to be used in the processing method shown in FIG. 8.
Figure 9:
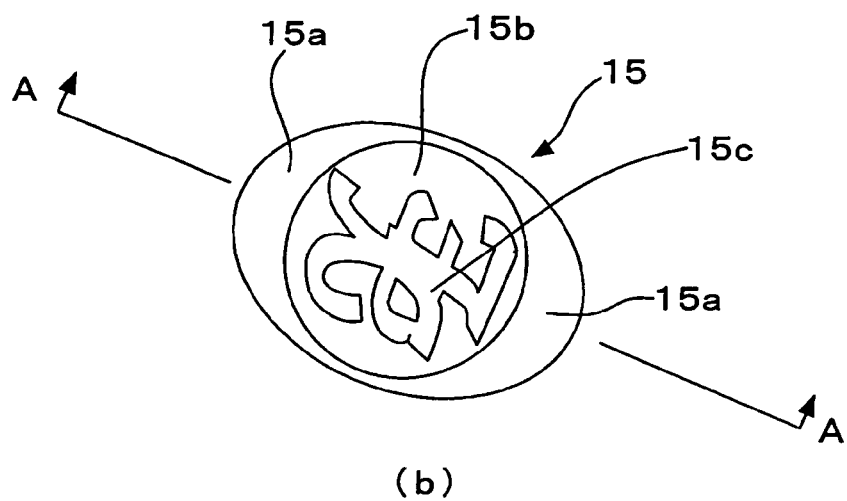
Figure 9:
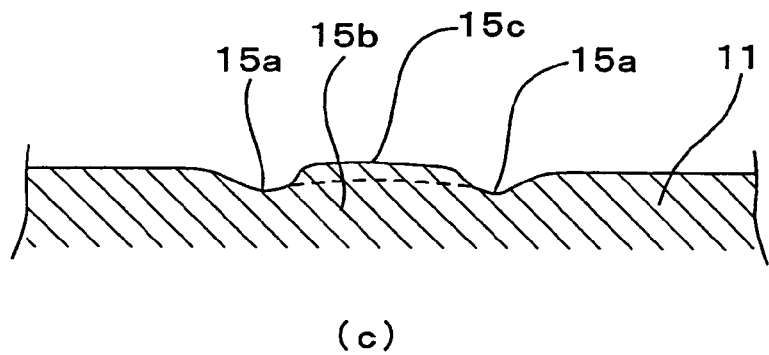

FIGS. 8 and 9 show the processing method in the third embodiment of this invention. This method is used to form the hollowed and raised portion 10 shown in FIG. 10. The procedure is basically similar to that of the first embodiment shown in FIG. 1. FIG. 8 shows a molding process similar to vacuum molding that corresponds to FIG. 1(c).

FIG. 9 show the mandrel 11 to be used in this third embodiment, in which 9(a) is a perspective view; 9(b) is a plan view showing the detail of the hollowed and raised mold portion 15 of FIGS. 9(a); and 9(c) is a vertical section taken along the line A-A shown in 9(b). The hollowed and raised mold portion 15 is formed as a mold portion 12 in the outer surface of the mandrel 11. Small through-holes 17 are disposed in the hollowed and raised mold portion 15 and also around the periphery thereof. Among FIG. 9, the embossed character pattern area 15c is not shown in FIG. 9(a); and the through-holes 17 are not shown in FIGS. 9(b) and 9(c), for the purpose of simplification.

The hollowed and raised mold portion 15 comprises an elliptical hollowed mold portion 15a, a round raised mold portion 15b, and an embossed character pattern area 15c, which is formed inside the round raised portion 10b and contains an alphabetical letter or letters displayed like an emblem.

As shown in FIG. 8, the mandrel 11 having the embossed character pattern area 15c is inserted in the tube 2 for the processing of the hollowed and raised portion 10. Usually, there occurs some gap between the tube 2 and the outer surface of the mandrel 11 in the part other than the hollowed and raised mold portion 15. However, similarly as in the second embodiment, the resin softens, and the heated resin contracts in and around the softened area. As a result, the tube wall comes in tight contact with the outer surface of the mandrel 11 on the periphery of the hollowed and raised mold portion 15 of the mandrel 11. Because of this close contact, deaeration by means of the vacuum pump proceeds effectively. Therefore, the hollowed and raised portion 10 can be formed by deforming the wall of the tube 2.

Also in this embodiment, the press die 22 is thrust onto the hollowed and raised portion 15 in the manner similar to press molding so that the shape of edges of the embossed character pattern area 15c, etc., is sharpened. The press die 22 having a flat press surface is used in this embodiment. If the up-and-down pattern is relatively shallow and low, the press die 22 having the flat press surface made of silicon rubber, such as the one used in this embodiment, is deformable to fit in with the shape of the hollowed and raised mold portion 15. Thus, the shape of the mold portion 12 can be transcribed smoothly to the tube 2. Since there is no need of delicate die matching between the mold portion 12 and the press die 22, high production efficiency is available for the processing steps, especially where there is a meticulous up-and-down pattern, such as found in the embossed character pattern area 15c of this embodiment.

If a hollowed and raised portion 10, such as the one shown in FIG. 10, is to be formed, a letter or letters 10d are hot-stamped beforehand on the tube 2. Then, the processing method of this embodiment is used to form the embossed character pattern area 10c so as to fit in with the letter or letters 10d. Naturally, the letter or letters can be printed instead of hot stamping. An identifying function can also be given to the tube 2 so that the tube 2 may be distinguished to the touch by hand. This can be done by utilizing the embossed character pattern area 10c of this embodiment, or differences in the shape, such as circle or square, and in the number, of any other hollowed and raised portions.

The method of processing a tube to form a hollowed and/or raised portion in the tube wall does not limit itself to the use with the tubular container that has been taken up in the above-described embodiments, but can be applied generally to the containers that utilize cylindrical shapes for the container body. For example, a cup container, in which to fill coffee drink, is obtained by adhering thermally the bottom to a cylindrical body. Such a cup container can also be processed by the method of forming the hollowed and/or raised portion according to this invention. Thus, tubular or cylindrical containers are provided, which have excellent decorativeness, appearance, or functionality that has not been found before.

In many cases, laminated tubular containers are used, in which an aluminum layer is laminated in such a construction as polyethylene-aluminum-polyethylene. Since the aluminum layer is usually thin, a hollowed and/or raised portion can be formed in the wall of the aluminum-laminated tube by combining the molding similar to vacuum molding with the molding similar to press molding, just as the same combination is utilized in the method of forming the above-described hollowed and/or raised portion in the single-layer tube wall.

INDUSTRIAL APPLICABILITY

According to the processing method of this invention, it is possible to provide a tubular container having an attractively hollowed and/or raised portion or portions formed in a part of the outer surface of the tube. In the field of cosmetics, etc., there will be an increasing range of uses for this promising tubular container.

The invention claimed is:

1. A method of processing a fully formed synthetic resin tube, which comprises:
   inserting a mandrel into the fully formed synthetic resin tube while bringing an inner wall of the fully formed synthetic resin tube into contact with the mandrel, wherein the mandrel is a bottomed cylindrical mandrel that is closed at one end, the mandrel having a first mold portion and a second mold portion, wherein the second mold portion has a shape formed in a non-circumferential part of an outer surface of the mandrel, which does not extend around an entire circumference of the mandrel, the shape being selected from a hollowed shape, a raised shape, and a hollowed and raised shape that is different than a shape of the first mold portion, the second mold portion having small through-holes for applying force;

heating and softening an area of the fully formed synthetic resin tube in and around an area facing the second mold portion after inserting the mandrel into the fully formed synthetic resin tube;

allowing a peripheral portion of the heated and softened area to surround an entire edge of the second mold portion and to come into tight contact therewith, as caused by thermal shrinkage involved in the heating and softening the area of the fully formed synthetic resin tube;

after coming into tight contact with the second mold portion by the thermal shrinkage, deaerating the fully formed synthetic resin tube via a central opening and the small through-holes of the second mold portion to mold the heated and softened area of the fully formed synthetic resin tube by vacuuming air in the fully formed synthetic resin tube; and forming in the heated and softened area of the fully formed synthetic resin tube at least one portion selected from a hollowed portion, a raised portion, and a hollowed and raised portion.

2. The method of processing a fully formed synthetic resin tube, according to claim 1, wherein at least one of the at least one shape selected from the hollowed portion, the raised portion, and the hollowed and raised portion is formed in the wall of the fully formed synthetic resin tube by vacuuming air in the fully formed synthetic resin tube, and wherein a press die made of a soft material is thrust onto the heated and softened area of the fully formed synthetic resin tube by pressing the press die onto the heated and softened area of the tube.

3. The method of processing a fully formed synthetic resin tube, according to claim 2, wherein the press die is made of silicon rubber.

4. The method of processing a fully formed synthetic resin tube, according to claim 2, the press die has a flat press surface.

5. The method of processing a fully formed synthetic resin tube, according to claim 2, further comprising using the press die, the press die having a press surface that roughly fits in with the shape of the second mold portion.

6. The method of processing a fully formed synthetic resin tube, according to claim 1, wherein the mandrel has a hollowed second mold portion in a part of the outer surface, and wherein the hollowed second mold portion forms a hollowed portion in the wall of the fully formed synthetic resin tube.

7. The method of processing a fully formed synthetic resin tube, according to claim 6, wherein the hollowed second mold portion has such a shape that a depth of the hollowed second mold portion changes gradually in a tapered manner in an axial direction of the mandrel.

8. The method of processing a fully formed synthetic resin tube, according to claim 1, wherein the mandrel has a raised second mold portion in a part of the outer surface, and wherein the raised second mold portion forms a raised portion in the wall of the fully formed synthetic resin tube.

9. The method of processing a fully formed synthetic resin tube, according to claim 1, wherein the mandrel has a hollowed and raised second mold portion in a part of the outer surface, and wherein the hollowed and raised second mold portion forms a hollowed and raised portion in the wall of the fully formed synthetic resin tube.

10. The method of processing a fully formed synthetic resin tube, according to claim 1, wherein at least one of the at least one portion selected from the hollowed portion, the raised portion, and the hollowed and raised portion is formed so as to have a label function for recognition.

11. The method of processing a fully formed synthetic resin tube, according to claim 1, wherein at least one of the at least one portion selected from the hollowed portion, the raised portion, and the hollowed and raised portion is formed so as to have a label function for a decorative purpose.

* * * * *

UNITED STATES PATENT AND TRADEMARK OFFICE
CERTIFICATE OF CORRECTION

| | | |
|---|---|---|
| PATENT NO. | : 7,846,377 B2 | Page 1 of 1 |
| APPLICATION NO. | : 10/548904 | |
| DATED | : December 7, 2010 | |
| INVENTOR(S) | : Shinji Shimada et al. | |

It is certified that error appears in the above-identified patent and that said Letters Patent is hereby corrected as shown below:

In the Specifications:

In col. 5, line 31, change "theabove-described" to "the above-described."

In col. 6, line 37, change "rubberis" to "rubber is."

In col. 6, line 44, change "surfaceis" to "surface is."

Signed and Sealed this
First Day of March, 2011

David J. Kappos
*Director of the United States Patent and Trademark Office*